(12) United States Patent
Matsumura

(10) Patent No.: US 11,085,343 B2
(45) Date of Patent: Aug. 10, 2021

(54) CONTROL APPARATUS AND CONTROL METHOD FOR EXHAUST PURIFICATION SYSTEM IN VEHICLE

(71) Applicant: DENSO CORPORATION, Kariya (JP)

(72) Inventor: Yasuhiro Matsumura, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/845,388

(22) Filed: Apr. 10, 2020

(65) Prior Publication Data
US 2020/0240307 A1 Jul. 30, 2020

Related U.S. Application Data

(63) Continuation of application No. PCT/JP2018/039076, filed on Oct. 19, 2018.

(30) Foreign Application Priority Data

Oct. 24, 2017 (JP) .............................. JP2017-205453

(51) Int. Cl.
*F01N 9/00* (2006.01)
*F01N 3/20* (2006.01)

(52) U.S. Cl.
CPC ............ *F01N 3/2013* (2013.01); *F01N 9/00* (2013.01); *F01N 2240/16* (2013.01); *F01N 2590/11* (2013.01); *F01N 2900/10* (2013.01); *F01N 2900/1602* (2013.01)

(58) Field of Classification Search
CPC ...... F01N 3/2013; F01N 9/00; F01N 2240/16; F01N 2900/1602; F01N 2590/11; F01N 2900/10
See application file for complete search history.

(56) References Cited

U.S. PATENT DOCUMENTS

| | | | |
|---|---|---|---|
| 8,413,423 B2* | 4/2013 | Roos | F01N 13/0097 60/284 |
| 8,727,050 B2* | 5/2014 | Roos | F02N 11/0807 180/65.275 |
| 9,127,582 B2* | 9/2015 | Harada | B60L 1/02 |
| 9,366,215 B2* | 6/2016 | Cunningham | F02N 11/0818 |
| 9,410,458 B2* | 8/2016 | Gonze | F01N 9/00 |
| 9,580,078 B2* | 2/2017 | Cauthen | B60W 30/18054 |
| 2006/0278449 A1* | 12/2006 | Torre-Bueno | B60K 6/46 180/65.29 |

FOREIGN PATENT DOCUMENTS

| | | |
|---|---|---|
| JP | 6-74026 | 3/1994 |
| JP | 10-288028 | 10/1998 |
| JP | 2007-321719 | 12/2007 |
| JP | 2009-167875 | 7/2009 |

* cited by examiner

*Primary Examiner* — Matthew T Largi
(74) *Attorney, Agent, or Firm* — Nixon & Vanderhye P.C.

(57) ABSTRACT

A control apparatus controls an exhaust purification system including an exhaust purification catalyst provided in an exhaust passage for an internal combustion engine in a vehicle, and an electric heating device for heating the exhaust purification catalyst in response to the supply of electricity. The control apparatus includes a prediction unit that detects at least one preliminary action of a startup action for the vehicle performed before the startup operation and predicts that the startup operation will be performed, and a heating control unit that causes the electric heating device to heat the exhaust purification catalyst if the prediction unit predicts that the startup operation will be performed.

13 Claims, 5 Drawing Sheets

CONTROL APPARATUS AND CONTROL METHOD FOR EXHAUST PURIFICATION SYSTEM IN VEHICLE

CROSS-REFERENCE TO RELATED APPLICATION

This application is a U.S. application under 35 U.S.C. 111(a) and 363 that claims the benefit under 35 U.S.C. 120 from International Application No. PCT/JP2018/039076 filed on Oct. 19, 2018, the entire contents of which are incorporated herein by reference. This application is based on Japanese Patent Application No. 2017-205453 filed on Oct. 24, 2017, the description of which is incorporated herein by reference.

BACKGROUND

Technical Field

The present disclosure relates to a control apparatus and a control method.

Background Art

The exhaust system for the internal combustion engine in a vehicle includes an exhaust purification catalyst for purifying the exhaust discharged when the internal combustion engine is run. A known example of the exhaust purification catalyst is a three-way catalyst capable of purifying harmful ingredients such as HC, CO, and NOx.

SUMMARY

The present disclosure provides a control apparatus for controlling an exhaust purification system including an exhaust purification catalyst, and an electric heating device for heating the exhaust purification catalyst. The control apparatus includes a prediction unit that detects at least one preliminary action for a startup operation, and a heating control unit that causes the electric heating device to heat the exhaust purification catalyst if the prediction unit predicts that the startup operation will be performed.

The present disclosure also provides a control method for the exhaust purification system that can be implemented by the control apparatus. The control method includes prediction step for detecting at least one preliminary action for a startup operation for the vehicle performed, and heating control step for heating the exhaust purification catalyst if it is predicted in the prediction step that the startup operation will be performed.

BRIEF DESCRIPTION OF THE DRAWINGS

The above and other objects, features, and advantages of the present disclosure will be clearly apparent from the detailed description provided below with reference to the accompanying drawings, in which.

DETAILED DESCRIPTION OF THE PREFERRED EMBODIMENTS

Figure 1:
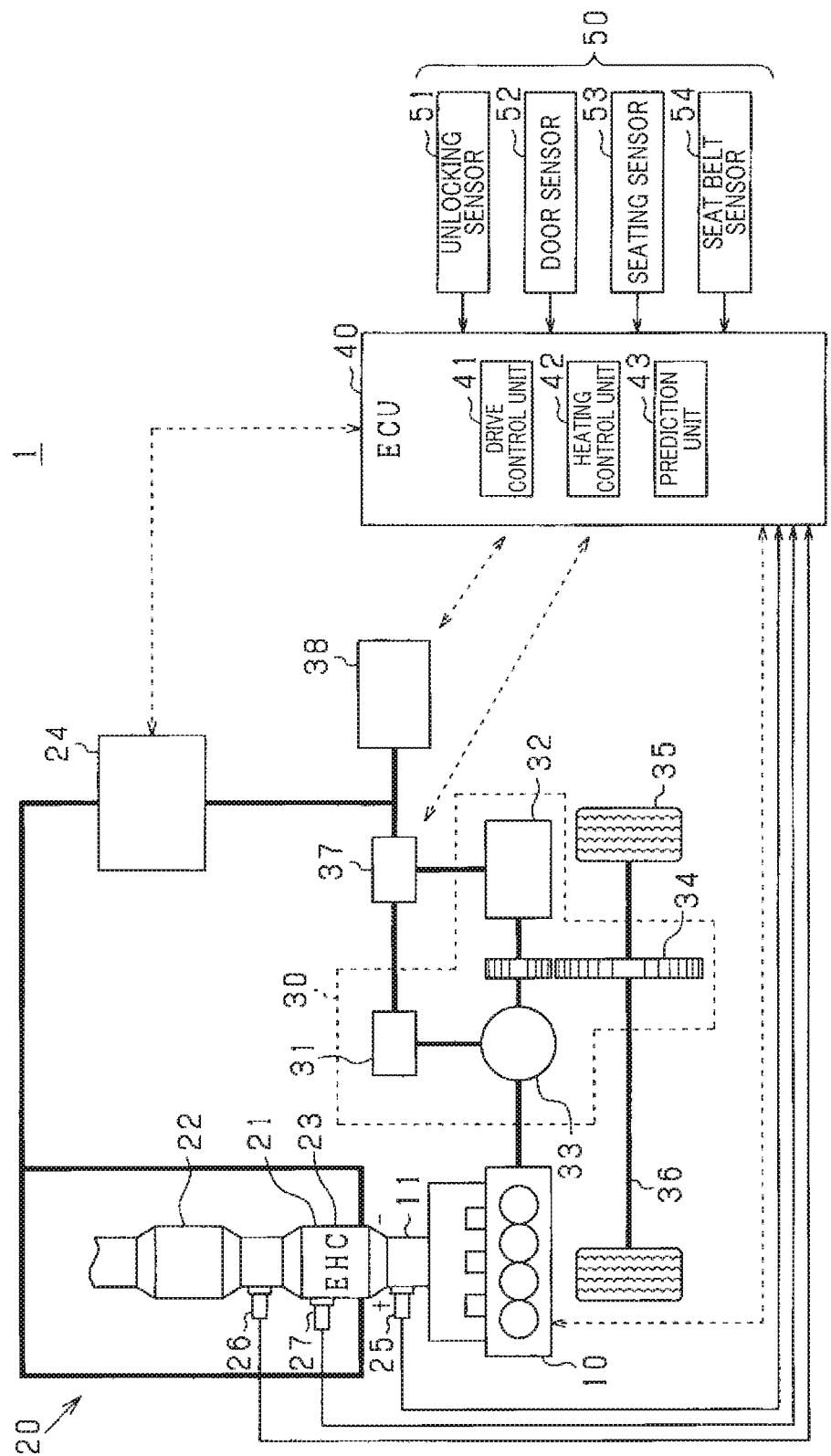
FIG. 1 illustrates the configuration of a drive system of a vehicle including a control apparatus for an exhaust purification system according to an embodiment.

The inventor of the present disclosure has studied a control apparatus and a control method for an exhaust purification system in a vehicle that quickly heat the exhaust purification catalyst when the vehicle is started as follows.

The catalytic activity of an exhaust purification catalyst depends on the catalyst temperature. When the exhaust purification catalyst does not reach its activation temperature, the internal combustion engine may be hindered from starting or the exhaust purification may be insufficient. To sufficiently purify the exhaust, the exhaust purification catalyst is to be heated to its activation temperature before the internal combustion engine is run. The exhaust purification catalyst can be heated, for example, using exhaust passing through the exhaust purification catalyst from the internal combustion engine, or an electrically heated catalyst (EHC) system that electrically heats the exhaust purification catalyst with a heater.

JP 10-288028 A describes a technique in which an exhaust purification catalyst is heated in response to a request to start an internal combustion engine in a hybrid vehicle that is traveling when the exhaust purification catalyst has a temperature equal to or less than its activation temperature. In the technique, when the remaining secondary battery capacity (SOC) is determined to be insufficient to heat the exhaust purification catalyst, the ignition timing of the internal combustion engine is retarded to increase the amount of exhaust heat, and the exhaust purification catalyst is also heated using the exhaust.

In a situation where a parked vehicle is entered and started, the exhaust purification catalyst often has a temperature significantly lower than the activation temperature, and it takes some time to heat the exhaust purification catalyst having low temperature to the activation temperature. Thus, a technique is needed to rapidly heat the exhaust purification catalyst when the vehicle starts.

In view of the above problem, an object of the present disclosure is to provide a control apparatus and a control method for an exhaust purification system in a vehicle that quickly heat the exhaust purification catalyst when the vehicle is started.

The present disclosure provides a control apparatus for controlling an exhaust purification system including an exhaust purification catalyst provided in an exhaust passage for the internal combustion engine in a vehicle, and an electric heating device for heating the exhaust purification catalyst in response to the supply of electricity. The control apparatus includes a prediction unit that detects at least one preliminary action for a startup operation for the vehicle before the startup operation and predicts that the startup operation will be performed, and a heating control unit that causes the electric heating device to heat the exhaust purification catalyst if the prediction unit predicts that the startup operation will be performed.

In the control apparatus according to the present disclosure, if the prediction unit predicts that the startup operation for the vehicle will be performed, the heating control unit causes the electric heating device to heat the exhaust purification catalyst. Heating the exhaust purification catalyst before the actual startup operation for the vehicle allows the exhaust purification catalyst to be rapidly heated when the vehicle is started.

The present disclosure also provides a control method for the exhaust purification system that can be implemented by the control apparatus. The control method includes prediction step for detecting at least one preliminary action for a startup operation for the vehicle performed before the startup operation and predicting that the startup operation will be performed, and heating control step for causing the electric heating device to heat the exhaust purification catalyst if it is predicted in the prediction step that the startup operation will be performed.

As shown in FIG. 1, a drive system 1 in a vehicle includes an internal combustion engine 10, an exhaust purification system 20 for purifying exhaust from the internal combustion engine 10, a power mechanism 30, an inverter 37, a high-voltage battery 38, and a control apparatus 40.

The power mechanism 30 includes a first motor generator (hereinafter referred to as the first MG) 31, a second motor generator (hereinafter referred to as the second MG) 32, a power distribution mechanism 33, and a reduction gear mechanism 34. The internal combustion engine 10 and the second MG 32 mainly serve as a power source for driving wheels 35. The crankshaft of the internal combustion engine 10, the rotational shaft of the first MG 31, and the rotational shaft of the second MG 32 are linked to each other via the power distribution mechanism 33 (for example, a planetary gear mechanism). The rotational shaft of the second MG 32 is linked to an axle 36 via the reduction gear mechanism 34.

The first MG 31 and the second MG 32 are connected to the high-voltage battery 38 via the inverter 37. The first MG 31 and the second MG 32 each transfer and receive power to and from the high-voltage battery 38 via the inverter 37.

The exhaust purification system 20 includes an exhaust purification catalyst layer 21 provided in an exhaust passage 11 for the internal combustion engine 10, and a particle removal layer 22. The exhaust purification catalyst layer 21 is a layer including an exhaust purification catalyst such as a three-way catalyst. The particle removal layer 22 is a layer for removing particulate matter mainly from exhaust, such as a gasoline particulate filter (GPF) or a four-way GPF with a catalyst supported on a GPF.

In FIG. 1, the one exhaust purification catalyst layer 21 is located upstream of the exhaust passage 11, and the one particle removal layer 22 is downstream. However, the number and order of layers are not limited to the illustration. In some cases, depend on the purification performance of the exhaust purification catalyst layer 21, the installation of the particle removal layer 22 may not needed. In FIG. 1, the exhaust purification catalyst layer 21 and the particle removal layer 22 are located in the exhaust passage 11 near the internal combustion engine 10. However, the layers 21 and 22 may be located away from the internal combustion engine 10. If the exhaust purification catalyst layer 21 and the particle removal layer 22 are located away from the internal combustion engine 10, the temperature of exhaust passing through the layers 21 and 22 decreases and reduces pressure loss.

To heat the exhaust purification catalyst of the exhaust purification catalyst layer 21, an EHC 23 corresponding to an electric heating device and a power supply circuit 24 for the EHC are provided. The EHC 23 is a conductive resistor on which the exhaust purification catalyst is supported, and forms a part of the exhaust purification catalyst layer 21. The EHC 23 is connected to the power supply circuit 24. When the high-voltage battery 38 powers the EHC 23 via the power supply circuit 24 to supply electric power to the conductive resistor of the EHC 23, the conductive resistor functions as a heater to heat the exhaust purification catalyst layer 21, which includes the exhaust purification catalyst.

The exhaust purification catalyst layer 21 may have the entire exhaust purification catalyst supported on the conductive resistor of the EHC 23 or a part of the exhaust purification catalyst supported on the conductive resistor of the EHC 23. For example, an upstream part of the carrier for the exhaust purification catalyst may be a conductive resistor, while only a downstream part may be a nonconductor, and the exhaust purification catalyst on the upstream part may be heated by the EHC 23. When the EHC 23 is supplied with electric power, the entire exhaust purification catalyst layer 21 is heated, and thus the exhaust purification catalyst unsupported by the conductive resistor of the EHC 23 is also indirectly heated. Although the EHC is described as an example in the present embodiment, the electric heating device may be any device capable of heating the exhaust purification catalyst by being supplied with electric power.

The electric power supplied to the EHC 23 is controlled by the power supply circuit 24. The power supply circuit 24 is provided with an electric power controller (not shown) including a switching circuit. The electric power controller subjects the power supplied from the high-voltage battery 38 to voltage conversion or smoothing and supplies the resultant power to the EHC 23.

The exhaust purification system 20 also includes exhaust sensors 25 and 26 provided at the inlet and the outlet of the exhaust purification catalyst layer 21, and a temperature sensor 27 provided on the exhaust purification catalyst layer 21 to detect the temperature of exhaust gas passing through the EHC 23. The exhaust sensors 25 and 26 are emission gas sensors (such as air-fuel ratio sensors or oxygen sensors) that determine the air-fuel ratio of the emission gas or whether the emission gas is rich or lean.

The control apparatus 40 is an electronic control unit (ECU) and is composed mainly of a microcomputer. The control apparatus 40 includes a drive control unit 41, a heating control unit 42, and a prediction unit 43. The drive control unit 41 controls the internal combustion engine 10 and the inverter 37 in accordance with the vehicle driving conditions to control the first MG 31 and the second MG 32. The heating control unit 42 controls the power supply circuit 24 to control the electric power supplied to the EHC 23. The prediction unit 43 detects one or more preliminary action for a startup operation for the vehicle performed before the startup operation, and predicts that the startup operation will be performed. If the prediction unit 43 predicts that the startup operation will be performed, the heating control unit 42 controls the power supply circuit 24 to supply electric power to the EHC 23, heating the exhaust purification catalyst.

Signals from various sensors 50 installed in the vehicle are input into the control apparatus 40. Specific examples of the various sensors 50 include an unlocking sensor 51 for detecting door unlocking, a door sensor 52 for detecting opening and closing of a vehicle door, a seating sensor 53 for detecting the occupant sitting in a seat, and a seat belt sensor 54 for detecting a seat belt being fastened or unfastened. Signals from an accelerator sensor for detecting the degree of accelerator opening (the amount by which the accelerator pedal is operated), a speed sensor for detecting the vehicle speed, a shift switch for detecting the operational position of the shift lever, and a brake switch for detecting the brake operation may be input to the control apparatus 40.

While the vehicle is traveling, the control apparatus 40 divides the power of the internal combustion engine 10 through the power distribution mechanism 33 into two lines, one for the first MG 31 and one for the axle 36. The output in one line drives the axle 36 and thus the wheels 35, and the output in the other line drives the first MG 31 to generate electricity. The generated power output drives the second MG 32, and the power of the second MG 32 also drives the axle 36 and thus the wheels 35. Furthermore, at sudden acceleration, the power output of the first MG 31 as well as the power of the high-voltage battery 38 are supplied to the second MG 32 to boost the driving of the second MG 32.

When decelerating, the vehicle performs deceleration energy regeneration (regenerative braking), in which the power of the wheels 35 drives the second MG 32, and the driven second MG 32 works as an electric generator to convert the kinetic energy of the vehicle into electric power recovered by (used for charging) the high-voltage battery 38.

At startup or during low-load conditions (where the internal combustion engine 10 has low fuel efficiency), the control apparatus 40 keeps the internal combustion engine 10 stopped while performing the EV traveling, in which the electric power of the high-voltage battery 38 drives the second MG 32, and the power of the second MG 32 drives the wheels 35 to travel.

To start the internal combustion engine 10, the first MG 31 is driven by the power of the high-voltage battery 38, and the power of the first MG 31 is transferred to the crankshaft of the internal combustion engine 10 via the power distribution mechanism 33. As a result, the crankshaft of the internal combustion engine 10 is rotationally driven to turn to start the internal combustion engine 10.

When the internal combustion engine 10 is started, the heating control unit 42 supplies the EHC 23 with electric power as appropriate to heat the exhaust purification catalyst. The catalytic activity of the exhaust purification catalyst depends on the catalyst temperature. In case the exhaust purification catalyst has not been reach its activation temperature, the internal combustion engine 10 may be hindered from starting or the exhaust purification system 20 may insufficiently purify exhaust.

Figure 2:
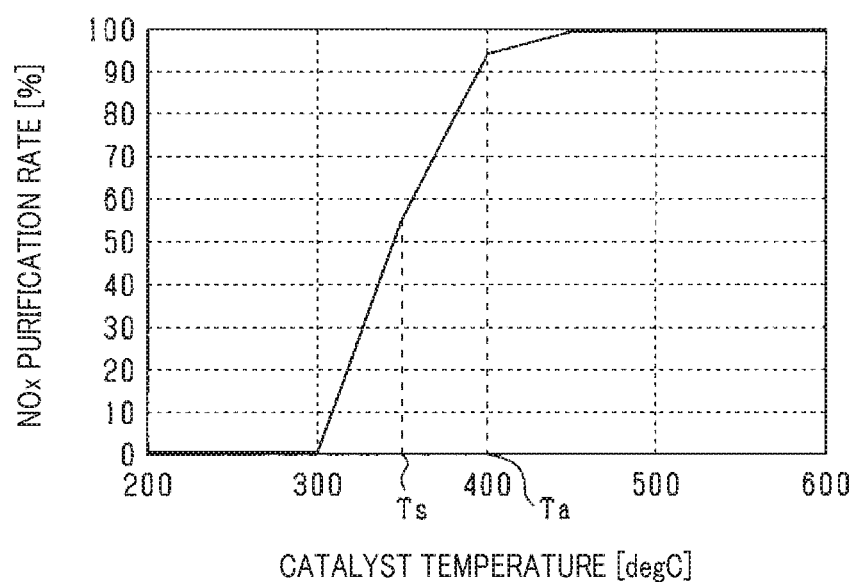
FIG. 2 illustrates the relationship between the catalytic activity and temperature of an exhaust purification catalyst.

The catalytic activity of the exhaust purification catalyst can be evaluated using, for example, the NOx purification rate by the exhaust purification catalyst. As shown in FIG. 2, the NOx purification rate of the exhaust purification catalyst depends on catalyst temperatures T and sharply increases at catalyst temperatures of about 300 to 400° C. The temperature at which the NOx purification rate reaches 95% is defined as a full activation temperature Ta, and the temperature at which the NOx purification rate reaches 50% is defined as a half activation temperature Ts. The catalytic activity of the exhaust purification catalyst varies in accordance with the catalyst temperature T. The catalytic activity can be evaluated as being inactive for $T<Ts$, half activated for $Ts \leq T < Ta$, and fully activated for $T \geq Ta$.

The NOx purification rate of the exhaust purification catalyst is an example indicator of the catalytic activity of the exhaust purification catalyst. The purification rate of other ingredients to be purified from exhaust (e.g., hydrocarbon ingredients or CO) may be used as an indicator of the catalytic activity of the exhaust purification catalyst.

The heating control unit 42 determines whether to supply electric power to the EHC 23 based on, for example, the exhaust gas temperature detected by the temperature sensor 27 when the gas passes through the exhaust purification catalyst layer 21. For example, the heating control unit 42 may supply electric power to the EHC 23 until the value detected by the temperature sensor 27 reaches the full activation temperature Ta. In other instances, the heating control unit 42 may use the temperature difference between the value detected by the temperature sensor 27 and the full activation temperature Ta to calculate an energy shortfall E representing the energy needed for the catalyst temperature T of the exhaust purification catalyst to reach the full activation temperature Ta. Then, the heating control unit 42 may supply electric power to the EHC 23 in accordance with the quantity of the energy shortfall E.

The heating control unit 42 may determine whether to supply electric power to the EHC 23 using the catalytic activity of the exhaust purification catalyst as well as another indicator. For example, to protect the high-voltage battery 38, the heating control unit 42 may supply electric power to the EHC 23 only when the external air temperature or the battery capacity (SOC) is equal to or greater than a predetermined value.

Before the startup operation for the vehicle, the control of supplying electric power to the EHC 23 by the heating control unit 42 is bound by the results of prediction performed by the prediction unit 43. If the prediction unit 43 predicts that the startup operation for the vehicle will be performed, the heating control unit 42 performs the supply of electric power to the EHC 23.

The prediction unit 43 detects one or more preliminary actions of a startup operation for the vehicle performed before the startup operation, and predicts that the startup operation will be performed. The startup operation is, for example, an operation to start the internal combustion engine 10, such as a Ready-ON operation by the occupant. The preliminary actions of the startup operation are acts that may be performed by the occupant before the startup operation, such as the occupant approaching the vehicle, unlocking of the vehicle, opening of a vehicle door, the occupant sitting in a seat, and the occupant fastening a seat belt. The prediction by the prediction unit 43 is performed at a period before the startup operation for the vehicle is carried out. For example, the prediction by the prediction unit 43 may be periodically performed when the startup operation for the vehicle is not performed and ended at the time when the startup operation for the vehicle is performed.

The preliminary actions may be detected through the various sensors 50 in the vehicle or signals input to the vehicle by the occupant's remote operation. For example, unlocking of the vehicle is detected by the unlocking sensor 51. For example, the occupant approaching the vehicle may be detected through a surrounding surveillance radar or a smart key. Opening of a vehicle door is detected by the door sensor 52. The occupant sitting in a seat is detected by the seating sensor 53. The occupant fastening a seat belt is detected by the seat belt sensor 54.

The prediction unit 43 may integrate the signals received from the various sensors 50 regarding the preliminary actions of the startup operation, and predict that the startup operation will be performed when the integrated value S is greater than a predetermined threshold X. In such a case, the detection signals of the preliminary actions may be treated equally. More specifically, the integrated value S of the detection signals of the preliminary actions may be calculated by regarding the presence of detection signal of a preliminary action as 1 and the absence as 0.

In other cases, the detection signals of the preliminary actions may be weighted as appropriate before the calculation of the integrated value S. For example, detection signals of a plurality of preliminary actions performed before the startup operation may be weighted in order of proximity to the startup operation, and then the integrated value S may be calculated. In other examples, detection signals from the door sensor 52, the seating sensor 53, and the seat belt sensor 54 may be given great weights as to the driver's seat over the other seats. The prediction unit 43 may store a sequence of acts performed by the driver until the startup operation, and weight detection signals of the preliminary actions in accordance with the stored sequence of acts.

More specifically, for example, preliminary actions of the startup operation defined may be an occupant approaching to the vehicle, unlocking of the vehicle, opening of a vehicle door, an occupant sitting in a seat, and the occupant fastening a seat belt, and values of weighting coefficients by which their signals are multiplied may increase depending of this order. In case that the occupant does not follow the sequence, and that, for example, the occupant performs the startup operation for the vehicle immediately after opening of a vehicle door, detection of a preliminary action by the prediction unit 43 is ended by the performance of the startup operation causes, and the heating control unit 42 performs the supply control of electric power to the EHC 23. Thus, the exhaust purification catalyst can be heated as appropriate while the occupant is sitting in a seat or fastening a seat belt after the startup operation.

The prediction unit 43 may exclude detection signals which is inappropriate as the preliminary actions from the detection signals of the preliminary actions received from the various sensors 50. For example, the seating sensor 53 and the seat belt sensor 54 constantly output signals for the seat to which a child seat is fastened. The exclusion of such constantly output signals from the detection signals of the preliminary actions enables the prediction unit 43 to more reliably predict whether the startup operation should be performed.

The threshold X may be constant or vary during a period from the start of detecting preliminary actions until the startup operation is performed (hereinafter sometimes referred to as a detecting period for the preliminary action). For example, the threshold X may increase over time in a continuous or stepwise manner. By setting the threshold X small at initial period of the detecting period for the preliminary action, heating the exhaust purification catalyst can be started at an earlier phase in response to the startup operation, thus allowing a rapid increase in the catalytic activity of the exhaust purification catalyst. By setting the threshold X to increase toward the end of the detecting period for the preliminary action, the exhaust purification catalyst is prevented from being overheated before the startup operation, thus reducing energy loss. The threshold X may increase over time from the time at which the prediction unit 43 starts its prediction or the time at which the prediction unit 43 detects the first preliminary action.

In case where any preliminary action is not detected during a predetermined time period after the prediction unit 43 detects a preliminary action before a startup operation and allows the EHC 23 to start heating the exhaust purification catalyst, the EHC 23 may stop heating the exhaust purification catalyst. For example, if there is no need to start the internal combustion engine 10, such as when the occupant is simply seated and taking a rest in the vehicle, the EHC 23 may stop heating the exhaust purification catalyst.

In case where the prediction unit 43 detects a preliminary action before a startup operation, allows the EHC 23 to start heating the exhaust purification catalyst, and then the detected preliminary action may be canceled, the prediction unit 43 may detect the cancellation to recalculate the integrated value S. After the integrated value S exceeds the threshold X and the EHC 23 is supplied with electric power, the cancellation of the preliminary action causes the integrated value S to become the threshold X or smaller, thus stopping the supply of electric power to the EHC 23. As a result, the supply of electric power to the EHC 23 is properly controlled.

The prediction unit 43 may predict that the startup operation for the vehicle will not be performed after detecting a signal of cancellation action (stop signal) predicting that the startup operation will not be performed. For example, if the prediction unit 43 predicts that the startup operation will not be performed after detecting at least one preliminary action, the heating control unit 42 may cause the EHC 23 to stop heating the exhaust purification catalyst by stopping the supply of electric power to the EHC 23. The determination of whether signals from the various sensors 50 are associated with cancellation action may be made depending on the controlled state of the EHC 23 by the heating control unit 42. More specifically, for example, when the occupant approaching to the vehicle, unlocking of the vehicle, opening of a vehicle door, and the occupant sitting in a seat are detected in this order, and the prediction unit 43 predicts that the startup operation will be performed, the heating control unit 42 supplies electric power to the EHC 23. In this state, when opening of a vehicle door and removing from a seat are detected, these actions may be determined as cancellation action to stop heating the exhaust purification catalyst.

The stop signal may be input by the occupant. For example, when the occupant is in the vehicle and there is no need to start the internal combustion engine 10, the EHC 23 may be caused to stop heating the exhaust purification catalyst through an operation performed by the occupant.

Figure 3:
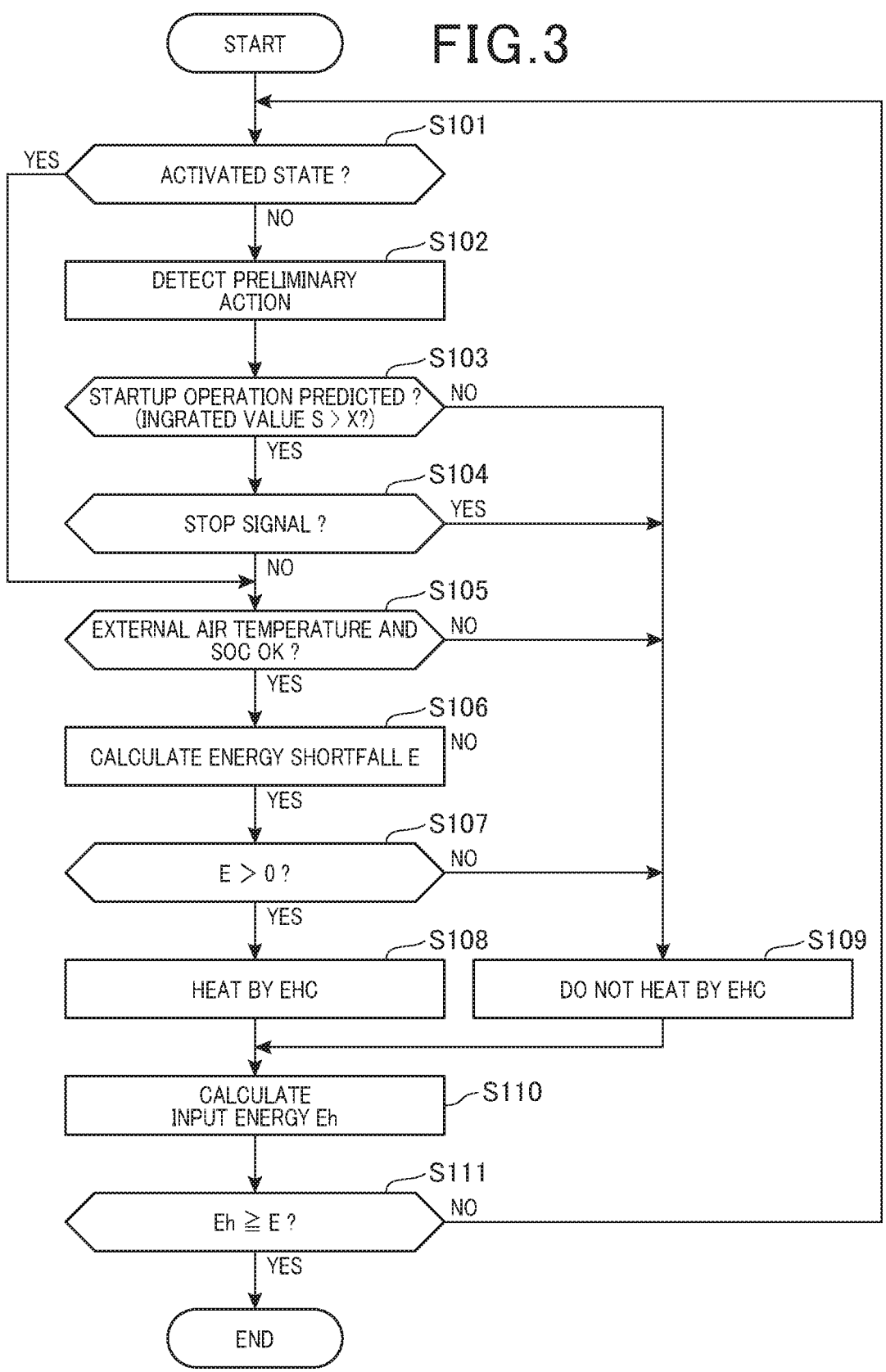
FIG. 3 is a flowchart illustrating a control method for the exhaust purification system according to the embodiment.

A control method for an exhaust treatment system performed by the control apparatus 40 will now be described with reference to FIG. 3. The control method includes prediction step for detecting one or more preliminary actions of a startup operation for the vehicle performed before the startup operation, and predicting that the startup operation will be performed (steps S102 to S104), and heating control step for causing the EHC 23 corresponding to an electric heating device to heat the exhaust purification catalyst (steps S105 to S111).

First, in step S101, it is determined whether the vehicle in activated state. For example, in case the vehicle is in Ready-ON state, it is determined that the vehicle is in activated state. If the vehicle is not in activated state, the method proceeds to step S102. If the vehicle is in activated state, the method proceeds to step S105 to shift to the heating control steps.

In step S102, signals are received from the various sensors 50, and a preliminary action of a startup operation is detected. Then, the method proceeds to step S103.

In step S103. it is determined whether a startup operation will be performed. More specifically, for example, the integrated value S of the signals associated with the preliminary action of a startup operation is calculated, and based on whether the integrated value S exceeds the predetermined threshold X, it is determined whether the startup operation will be performed. The predetermined threshold X may be a constant threshold X1 or a threshold X2 that increases proportionally with time t from the start of a period during which prediction is performed (prediction period). More specifically, for example, X2 may be set at $kt+X0$ (where k is a constant, and X0 is a threshold at time t that is 0). In some cases, X2 may be set at $kt+Xf$ (where k is a constant, and Xf is a threshold at time tf at which the first preliminary action is detected).

In step S103, if the integrated value S>the threshold X, the startup operation is determined to be performed, and the method proceeds to step S104. If the integrated value S≤the threshold X, no startup operation is determined to be performed, the method proceeds to step S109, and no electric power is supplied to the EHC 23.

In step S103, without calculating the integrated value S, it may be determined whether the startup operation will be performed, based on whether a preliminary action of a startup operation is detected. More specifically, if the preliminary action of a startup operation is detected, the method proceeds to step S104; otherwise, the method proceeds to step S109.

In step S104, it is determined whether a stop signal action (stop signal) predicting that the startup operation will not be performed is detected from the various sensors 50. If no stop signal is detected, the method proceeds to step S105 to shift from the prediction step to the heating control step. If a stop signal is detected, the method proceeds to step S109, and supply of electric power to the EHC 23 is not performed.

In step S105, it is determined whether the EHC 23 can be supplied with electric power by referring to the external air temperature and the SOC value of the high-voltage battery 38. For example, when the external air temperature is equal to or greater than a predetermined temperature, and the SOC is equal to or greater than a predetermined value, it is determined that the EHC 23 can be supplied with electric power. If it is determined that electric power can be supplied, the method proceeds to step S106. If it is determined that no electric power can be supplied, the method proceeds to step S109, and supply of electric power to the EHC 23 is not performed.

In step S106, the energy required for the catalyst temperature T of the exhaust purification catalyst to reach the full activation temperature Ta is calculated as an energy shortfall E, and then the method proceeds to step S107. For example, the energy required for the temperature of the exhaust purification catalyst to reach the full activation temperature Ta can be calculated based on the temperature difference between the value detected by the temperature sensor 27 and the full activation temperature Ta.

In step S107, it is determined whether the exhaust purification catalyst needs to be heated by supplying the EHC 23 with electric power. More specifically, the temperature difference ΔT between the full activation temperature Ta and the actual temperature (e.g., temperature T1 at the time of step S106) of the exhaust purification catalyst (e.g., ΔT=Ta−T1) is used to calculate the energy shortfall E. If E>0, the exhaust purification catalyst is determined to need to be heated. If E≤0, the exhaust purification catalyst is determined to need no heating. If the exhaust purification catalyst is determined to need to be heated, the method proceeds to step S108, and supply of electric power to the EHC 23 is performed. If the exhaust purification catalyst is determined to need no heating, the method proceeds to step S109, and no electric power is supplied to the EHC 23. After step S108 or step S109, the method proceeds to step S110.

In step S110, the energy applied to heating the exhaust purification catalyst (input energy) Eh is calculated from the time of step S106 to the current time. The input energy Eh may be calculated, for example, based on the power supplied from the high-voltage battery 38 to the EHC 23. The input energy Eh may also be calculated, for example, based on the specific heat of the exhaust purification catalyst, and the difference between temperature T2 of the exhaust purification catalyst at the time of step S110 and temperature T1 of the exhaust purification catalyst at the time of step S106, T2-T1. After step S110, the method proceeds to step S111.

In step S111, it is determined whether heating the exhaust purification catalyst is completed. More specifically, for example, the energy shortfall E calculated in step S106 is compared with the input energy Eh calculated in step S110. If Eh<E, the method returns to step S101. If Eh≥E, the process is finished. In other cases, the determination of whether heating the exhaust purification catalyst is completed may be made in accordance with whether the actual temperature of the exhaust purification catalyst is greater than the full activation temperature Ta. More specifically, for example, if T<Ta, the method may return to step S101. If T≥Ta, the process may be finished.

The behavior of the exhaust purification system 20 achieved by the above control will now be described with reference to the timing charts of FIGS. 4 to 7. The horizontal axis of each timing chart of FIGS. 4 to 7 represents a time axis. The vertical axis indicates the vehicle activation state, the determination of a preliminary action (FIG. 4) or the integrated value of signals associated with a preliminary action (FIGS. 5 to 7), the temperature of the exhaust purification catalyst layer 21, the energy shortfall E, the EHC-applied voltage, and the catalytic activity of the exhaust purification catalyst in this order from top to bottom.

Figure 4:
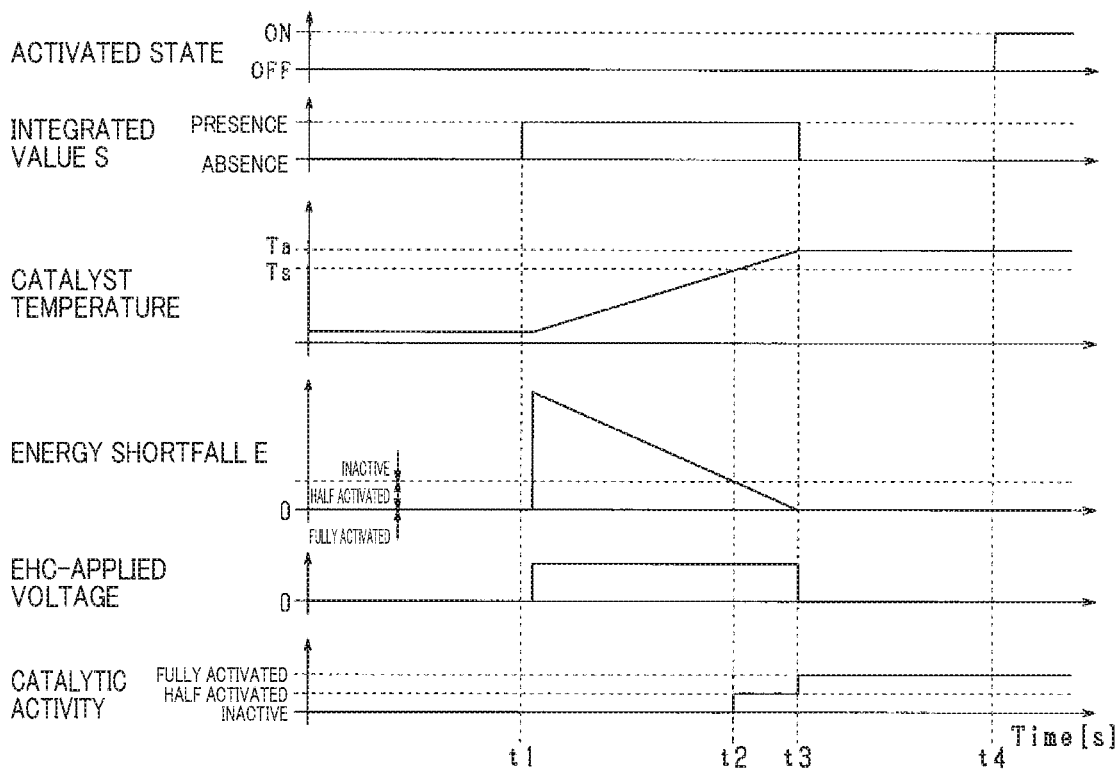
FIG. 4 is a timing chart for the control of the exhaust purification system according to one embodiment.

FIG. 4 shows a case in which when signals output from the various sensors 50 include a signal associated with a preliminary action of a startup operation, the startup operation is predicted to be performed. Preliminary actions of a startup operation defined are the occupant approaching to the vehicle, unlocking of the vehicle, opening of a vehicle door, the occupant sitting in a seat, and the occupant fastening a seat belt.

A preliminary action is detected at time t1, and thus the energy shortfall E is calculated. As a result, the exhaust purification catalyst is determined to be inactive and required to be heated, and the EHC 23 is supplied with electric power.

The preliminary action is constantly detected during times t1 to t3. Thus, the supply of electric power to the EHC 23 continues, and the temperature of the exhaust purification catalyst layer 21 increases with time. The temperature reaches the half activation temperature Ts at time t2, and the full activation temperature Ta at time t3. At time t3, the energy shortfall E reaches 0, and the supply of electric power to the EHC 23 stops. Heating the exhaust purification catalyst is completed before time t4, at which the occupant performs the startup operation.

Figure 5:
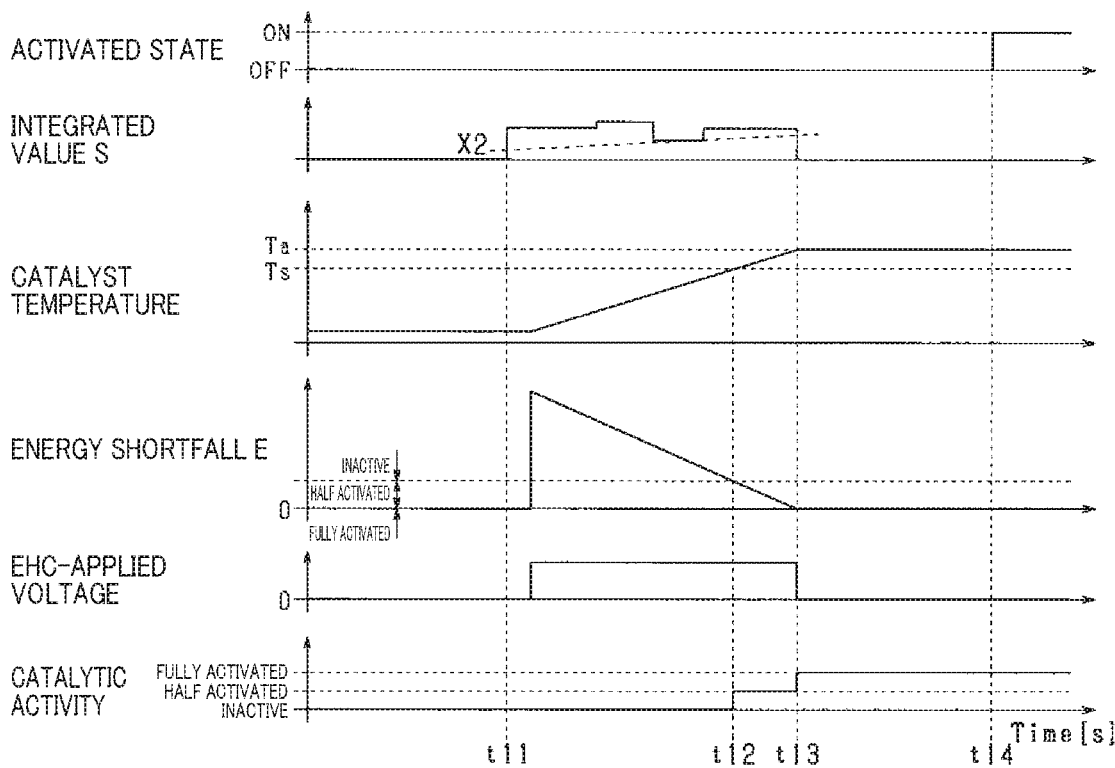
FIG. 5 is a timing chart for the control of the exhaust purification system according to another embodiment.

FIG. 5 shows a case in which among the signals from the various sensors 50, signals associated with a plurality of preliminary actions of a startup operation are weighted, the integrated value S of the signals is calculated, and a threshold X2 that increases proportionally with time t (indicated by a dashed line in the chart for the integrated value S in FIG. 5) is used to predict the startup operation. The threshold X2 can be expressed by kt+Xf (where k is a constant, and Xf is a threshold at time tf=t11, at which the first preliminary action is detected). The preliminary actions of the startup operation defined are the occupant approaching to the vehicle, unlocking of the vehicle, opening of a vehicle door, the occupant sitting in a seat, and the occupant fastening a seat belt, and their signals are multiplied by weighting coefficients that increase toward the end of the sequence.

At time t11, it is determined that the integrated value S>X2, and thus the energy shortfall E is calculated. As a result, the exhaust purification catalyst is determined to be inactive and need to be heated, and the supply of electric power to the EHC 23 is performed.

When a detected preliminary action is canceled, the integrated value S is recalculated. The integrated value S thus varies during times t1 to t13. However, because the state in which S>X2 is maintained, the supply of electric power to the EHC 23 continues. As a result, the temperature of the exhaust purification catalyst layer 21 increases with time, and the temperature reaches the half activation temperature Ts at time t12 and the full activation temperature Ta at time t13. At time t13, the energy shortfall E reaches 0, and the supply of electric power to the EHC 23 stops. Heating the exhaust purification catalyst is completed before time t14, at which the occupant performs the startup operation.

Figure 6:
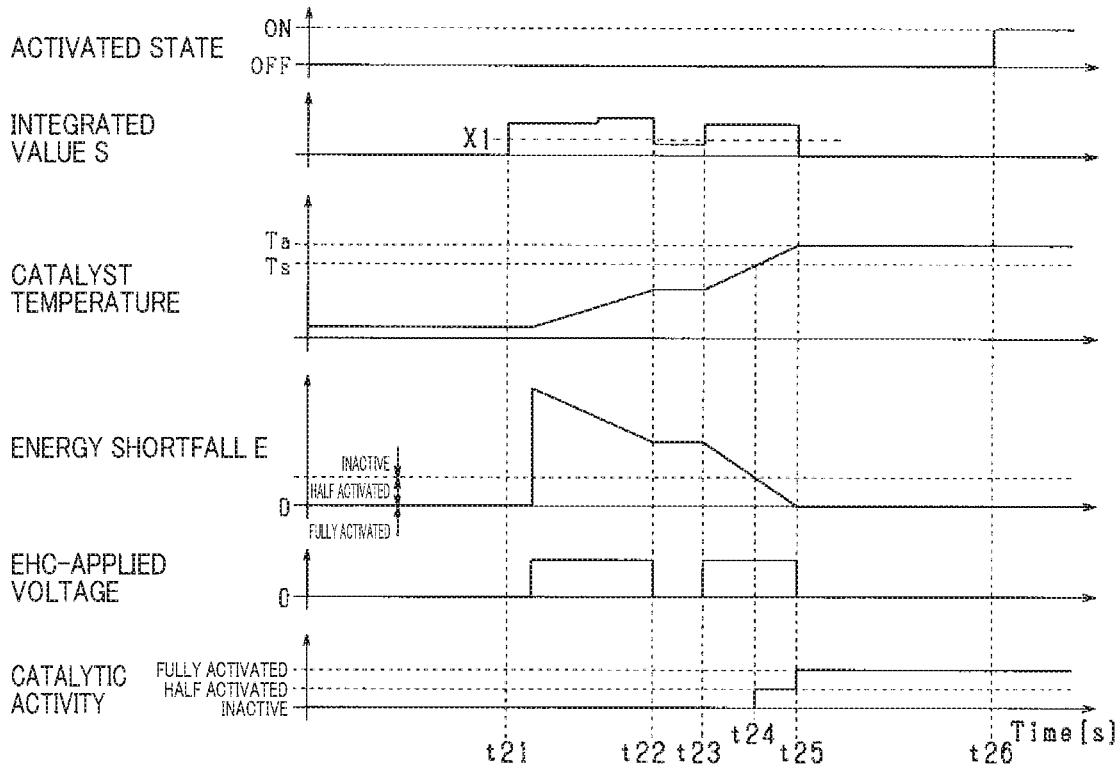
FIG. 6 is a timing chart for the control of the exhaust purification system according to another embodiment.

FIG. 6 shows a case in which among the signals from the various sensors 50, signals associated with a plurality of preliminary actions of a startup operation are weighted, the integrated value S of the signals is calculated, and a constant threshold X1 (indicated by a dashed line in the chart for the integrated value S in FIG. 6) is used to predict the startup operation.

At time t21, it is determined that integrated value S>X1, and thus the energy shortfall E is calculated. As a result, the exhaust purification catalyst is determined to be inactive and needs to be heated, and supply of electric power to the EHC 23 is performed.

The integrated value S increases during time t21 to time t22, and the state in which S>X1 is maintained. Accordingly, the supply of electric power to the EHC 23 continues, and the temperature of the exhaust purification catalyst layer 21 increases with time.

At time t22, as a result of the recalculation of the integrated value S, it is determined that the integrated value S has lowered and S≤X1. Thus, the method proceeds to step S109, and the supply of electric power to the EHC 23 stops. Because S≤X1 during time t22 to time t23, supply of electric power to the EHC 23 is not performed, and the temperature of the exhaust purification catalyst layer 21 hardly increases.

At time t23, as a result of the recalculation of the integrated value S, it is determined that the integrated value S has increased and S>X1. Thus, the energy shortfall E is calculated again. As a result, the exhaust purification catalyst is determined to be inactive and need to be heated, and the supply of electric power to the EHC 23 is restarted.

The integrated value S is constant during time t23 to time t25, and S>X1. Accordingly, the supply of electric power to the EHC 23 continues, and the temperature of the exhaust purification catalyst layer 21 increases with time. The temperature reaches the half activation temperature Ts at time t24, and the full activation temperature Ta at time t25. At time t25, the energy shortfall E reaches 0, and the supply of electric power to the EHC 23 stops. Heating the exhaust purification catalyst is completed before time t26, at which the occupant performs the startup operation.

Figure 7:
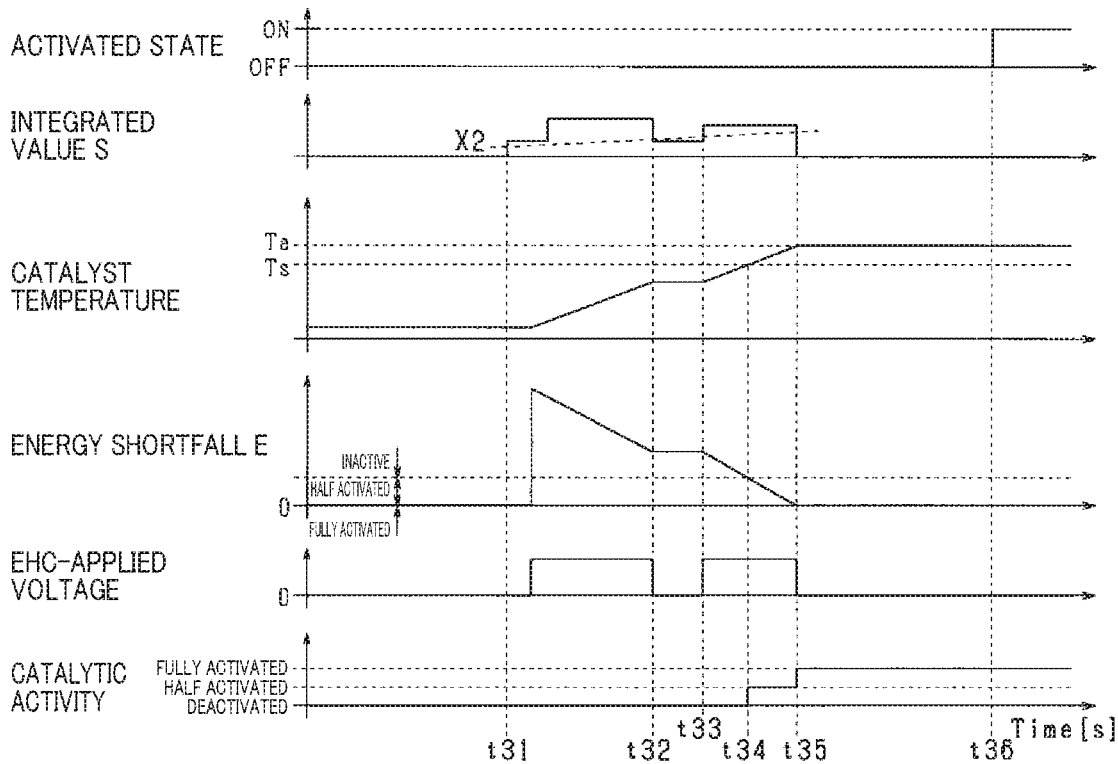
FIG. 7 is a timing chart for the control of the exhaust purification system according to another embodiment.

FIG. 7 shows a case in which among the signals from the various sensors 50, signals associated with a plurality of preliminary actions of a startup operation are weighted, the integrated value S of the signals is calculated, and a threshold X2 that increases proportionally with time t (indicated by a dashed line in the chart for the integrated value S in FIG. 7) is used to predict the startup operation. The threshold X2 can be expressed by kt+Xf (where k is a constant, and Xf is a threshold at time tf=t31, at which the first preliminary action is detected). The preliminary actions of a startup operation defined are the occupant approaching to the vehicle, unlocking of the vehicle, opening of a vehicle door, the occupant sitting in a seat, and the occupant fastening a seat belt, and their signals are multiplied by weighting coefficients that increase toward the end of the sequence.

At time t31, it is determined that integrated value S>X2, and thus the energy shortfall E is calculated. As a result, the exhaust purification catalyst is determined to be inactive and needs to be heated, and supply of electric power to the EHC 23 is performed.

The integrated value S increases during time t31 to time t32, and the state in which S>X2 is maintained. Accordingly, the supply of electric power to the EHC 23 continues, and the temperature of the exhaust purification catalyst layer 21 increases with time.

At time t32, as a result of the recalculation of the integrated value S, it is determined that the integrated value S has been reduced, and now integrated value S≤X2. Thus, the method proceeds to step S109, and the supply of electric power to the EHC 23 stops. Because S≤X2 during time t32 to time t33, the supply of electric power to the EHC 23 is not performed, and the temperature of the exhaust purification catalyst layer 21 hardly increases.

At time t33, as a result of the prediction unit 43 recalculating the integrated value S, it is determined that the integrated value S has increased and the integrated value S>X2. Thus, the energy shortfall E is calculated again. As a result, the exhaust purification catalyst is determined to be inactive and needs to be heated, and the supply of electric power to the EHC 23 is restarted.

The integrated value S is constant during time t33 to time t35, and S>X2. Accordingly, the supply of electric power to the EHC 23 continues, and the temperature of the exhaust purification catalyst layer 21 increases with time. The temperature reaches the half activation temperature Ts at time t34, and the full activation temperature Ta at time t35. At time t35, the energy shortfall E reaches 0, and the supply of electric power to the EHC 23 stops. Heating the exhaust purification catalyst is completed before time t36, at which the occupant performs the startup operation.

In the control apparatus 40, as described above, if the prediction unit 43 predicts that the startup operation for the vehicle will be performed, the heating control unit 42 causes the EHC 23 to heat the exhaust purification catalyst. Heating the exhaust purification catalyst before the actual startup operation for the vehicle allows the exhaust purification catalyst to be quickly heated when the vehicle is started.

In the embodiments, a case in which the control apparatus 40 is composed of a single control unit is exemplary illustrated, but the present disclosure is not limited to this. For example, the control apparatus 40 may include a plurality of control units such as a hybrid ECU that controls the overall hybrid vehicle, an internal combustion engine ECU that controls the internal combustion engine 10, and an MG-ECU that controls the inverter 37 to control the MG 31 and the MG 32. In this case, the hybrid ECU may send and receive control signals and data signals to and from the internal combustion engine ECU and the MG-ECU and the like, and cause the internal combustion engine ECU and the MG-ECU and the like to control the internal combustion engine 10, the MG 31, and the MG 32. One of the internal combustion engine ECU and the MG-ECU may control the power supply circuit 24 to control the electric power supplied to the EHC 23. In other cases, a dedicated ECU may be installed to control the power supply circuit 24 to control the electric power supplied to the EHC 23.

Although the present disclosure has been described based on the embodiments, it is to be understood that the disclosure is not limited to the embodiments and the structures. The present disclosure also encompasses various modifications and alterations falling within the scope of equivalent. Furthermore, various combinations and forms as well as other combinations and forms with one, more than one, or less than one element added thereto also fall within the scope and spirit of the present disclosure.

What is claimed is:

1. A control apparatus for controlling an exhaust purification system including an exhaust purification catalyst provided in an exhaust passage for an internal combustion engine in a vehicle, and an electric heater for heating the exhaust purification catalyst in response to supply of electricity, the control apparatus comprising:
 a prediction unit configured to detect a plurality of preliminary actions for a startup operation for the vehicle performed before the startup operation and predict that the startup operation will be performed and
 a heating control unit configured to cause the electric heater to heat the exhaust purification catalyst if the prediction unit predicts that the startup operation will be performed, wherein
 the plurality of preliminary actions are predefined,
 the prediction unit calculates an integrated value in which detection signals of the plurality of preliminary actions are integrated, and predicts that the startup operation will be performed when the integrated value is greater than a predetermined threshold, and
 the nearer to the startup operation an order of each preliminary action in the plurality of preliminary actions is performed, the more the prediction unit weights the detection signals of each preliminary action in the plurality of preliminary actions in accordance with the order of the plurality of the preliminary actions and calculates the integrated value.

2. The control apparatus according to claim 1, wherein the predetermined threshold increases over time during a prediction period in which prediction of the startup operation is performed by the prediction unit.

3. The control apparatus according to claim 1, wherein the prediction unit detects cancellation action predicting that the startup operation will not be performed for the vehicle, after detecting at least one of the plurality of the preliminary actions, and thereby predicts that the startup operation will not be performed, and
 if the prediction unit predicts that the startup operation will not be performed, the heating control unit causes the electric heater to stop heating the exhaust purification catalyst.

4. The control apparatus according to claim 1, wherein the prediction unit excludes a constantly detected action from the plurality of the preliminary actions.

5. The control apparatus according to claim 1, wherein the prediction unit detects one or more actions of an occupant approaching to the vehicle, unlocking of a door, opening or closing of a door, the occupant sitting in a seat, and fastening a seat belt, as the plurality of the preliminary actions.

6. The control apparatus according to claim 1, wherein the predetermined threshold increases proportionally over time during a prediction period in which prediction of the startup operation is performed by the prediction unit.

7. The control apparatus according to claim 1, wherein the detection signals corresponding to the plurality of preliminary actions are multiplied by respective weighting coefficients that increase toward an end of a sequence of the plurality of preliminary actions.

8. A control method for controlling an exhaust purification system including an exhaust purification catalyst provided in an exhaust passage for an internal combustion engine in a vehicle, and an electric for heating the exhaust purification catalyst in response to supply of electricity, the method comprising:
 performing a prediction for detecting a plurality of preliminary actions for a startup operation for the vehicle performed before the startup operation and predicting that the startup operation will be performed; and
 performing a heating control for causing the electric heater to heat the exhaust purification catalyst if it is predicted in the performed prediction that the startup operation will be performed, wherein
 the plurality of preliminary actions are predefined, and
 in the prediction, an integrated value in which detection signals of the plurality of the preliminary actions are integrated is calculated and when the integrated value is greater than a predetermined threshold, it is predicted that the startup operation will be performed, and
 the nearer to the startup operation an order of each preliminary action in the plurality of preliminary actions is performed, the more the detection signals of each preliminary action in the plurality of preliminary actions are weighted in accordance with the order of the plurality of the preliminary actions to calculate the integrated value.

9. The method according to claim 8, wherein
 the predetermined threshold increases proportionally over time during a prediction period in which prediction of the startup operation is performed.

10. The method according to claim 8, further comprising:
 predicting that the startup operation will not be performed for the vehicle after detecting at least one of the plurality of the preliminary actions; and
 causing the electric heater to stop heating the exhaust purification catalyst based on a prediction that the startup operation will not be performed.

11. The method according to claim 8, wherein a constantly detected action from the plurality of the preliminary action is excluded.

12. The method according to claim 8, wherein
 one or more actions of an occupant approaching to the vehicle, unlocking of a door, opening or closing of a door, the occupant sitting in a seat, and fastening a seat belt is detected as the plurality of the preliminary actions.

13. The method according to claim 8, wherein
 signals corresponding to the plurality of preliminary actions are multiplied by respective weighting coefficients that increase toward an end of a sequence of the plurality of preliminary actions.

* * * * *